United States Patent Office 3,415,120
Patented Dec. 10, 1968

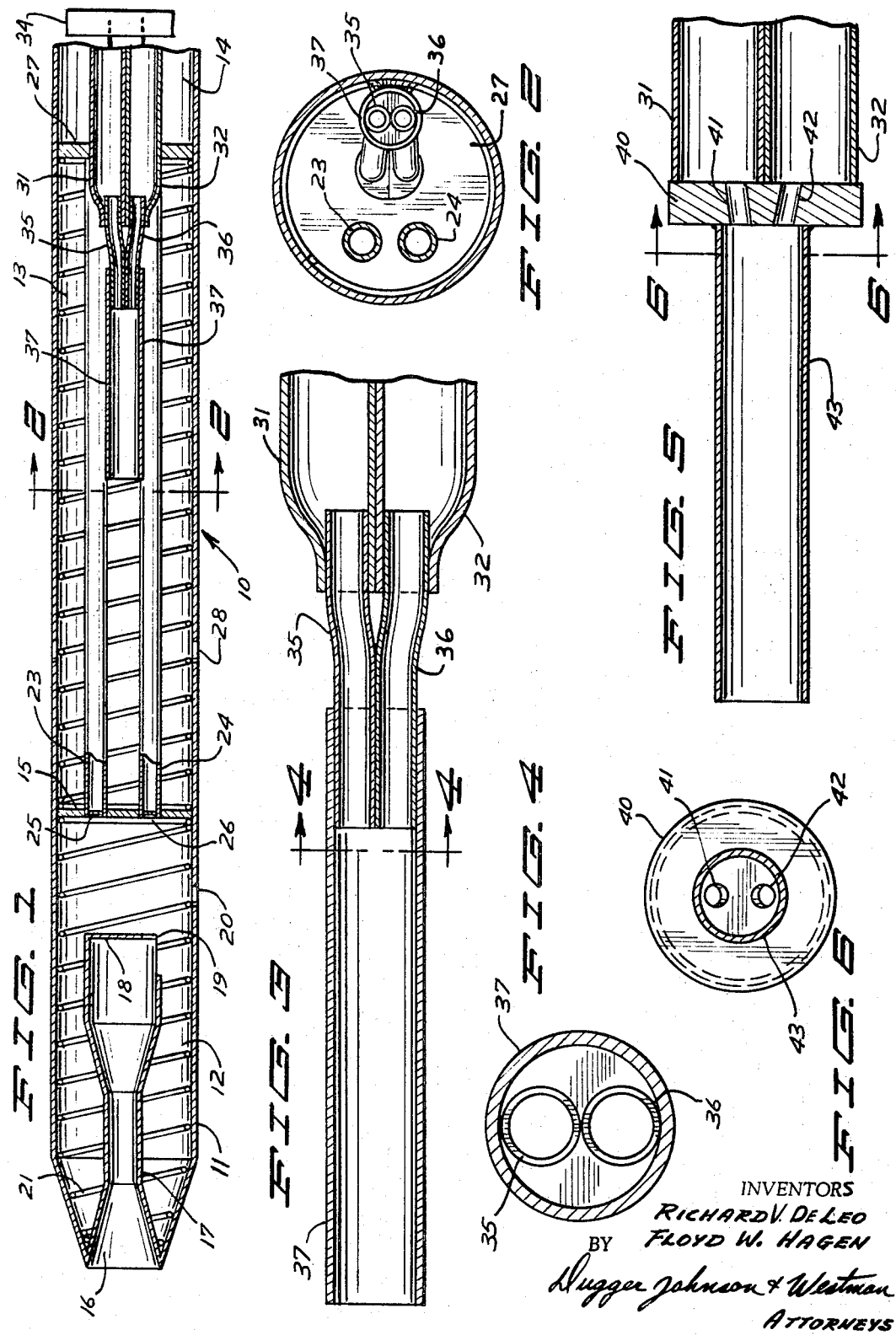

3,415,120
DUAL STATIC TUBE
Richard V. De Leo, Hopkins, and Floyd W. Hagen,
Minneapolis, Minn., assignors to Rosemount Engineering Company, Minneapolis, Minn., a corporation of Minnesota
Filed Jan. 12, 1966, Ser. No. 520,247
10 Claims. (Cl. 73—212)

ABSTRACT OF THE DISCLOSURE

A dual static system for compensating static pressure measurements in the case of failure of one static pressure line in an area of higher pressure than the static probe itself. Two lines are used, coming from a common probe, and both lines exhaust into a mixing chamber which surrounds the ends of both lines. Leakage flow from the pressurized area through one of the static lines caused by a leak hole in the pressurized area will discharge fluid into the mixing chamber and the ejector action of the flow from the damaged tube will cause an apparent reduction in pressure in the adjacent line in relation to the pressure in the static chamber. Because the static chamber pressure will rise due to the leakage flow into the chamber, the net result is that the static pressure in the unbroken line will remain substantially constant and give reliable readings.

---

The present invention has relation to a dual pressure measuring system for aircraft, and particularly to a dual static pressure measuring system which automatically compensates for leakage of one system in an area of higher pressure than the sensing static pressure port.

The present application represents certain improvements in relation to the static system over the application of Richard V. De Leo, Ser. No. 378,368, filed June 26, 1964, now U.S. Patent 3,364,742.

The said application Ser. No. 378,368 discloses a means for obtaining nearly dual pitot and static tube reliability without the use of two separate probes. This is accomplished by use of automatic restrictors in each of the two sets of fluid pressure transmission lines. In case of failure in one pressure system, the restrictor limits the amount of gas flow to or from the defective system.

The restrictors work well in most conditions. However, in dual static systems using restrictors only, some difficulties can develop when leakage in one static line occurs in the pressurized cabin area of an aircraft and when the aircraft is very high. Because the pressure differential between the inside of the aircraft and the outside may be up to 8 p.s.i., in order to maintain a second static tube relatively uneffected by severe leakage in a first tube in a pressurized region there would be a requirement of very small restrictors in each line or a very large static pressure orifice in the external probe. These alternatives are not commercially desirable.

As shown, the restrictors disclosed in the earlier application are still used in the pressure lines, but in addition both of the dual static tubes exhaust into a larger tubing which surrounds the ends of both tubes of the dual system. This large tubing will be termed a "mixing tube" or "ejector tube." Leakage flow from the pressurized area through one of the static tubes will discharge into the mixing tube and the ejector action of the flow from the damaged tube will cause an apparent reduction in pressure on the adjacent system. Because the static chamber pressure will rise due to the leakage flow into the chamber, the net result is that the static pressure in the unaffected lines will remain substantially constant.

It is therefore an object of the present invention to present a dual static tube system wherein failure of one of the static tubes in a pressurized area will not cause erroneous pressures in the other tube.

It is a further object of the present invention to present a simplified structure for accomplishing this result.

Other objects are inherent in the specification and will become apparent as the description proceeds.

In the drawings:

FIG. 1 is a vertical sectional view of a typical pitot-static tube used with a nose boom mounting embodying the dual static pressure system of the present invention;

FIG. 2 is a sectional view taken as on line 2—2 of FIG. 1;

FIG. 3 is an enlarged sectional view of the static tube portions of the device of FIG. 1;

FIG. 4 is a sectional view taken as on line 4—4 in FIG. 3;

FIG. 5 is an enlarged sectional view of a modified form of the dual static system shown in FIG. 3; and FIG. 6 is a sectional view taken as on line 6—6 in FIG. 5.

Referring to the drawings and the numerals of reference thereon, a pitot-static tube illustrated generally at 10 is shown in the form that would be normally used for mounting onto a nose boom of an aircraft or other object using such a tube. Throughout the description, this invention will deal with respect to the nose boom tube, but it is to be understood that fuselage mounted tubes or other mountings can be utilized with the present invention interchangeably. The mountings and outer construction of the pitot-static tube is conventional.

The pitot-static tube 10 includes an outer housing 11 which is divided into a forward compartment 12, a center static chamber 13 and a rear extension 14, on which the mounting means (not shown) would be placed for mounting it onto the nose boom. A bulkhead 15 divides the forward and center chambers of the housing.

The pitot tube section comprises an inlet opening 16 which opens to a tube 17 that terminates in the forward compartment or chamber 12. The tube 17 has a rear section 18 with an opening 19 discharging into the forward chamber. The forward compartment also has a drain hole 20 for draining accumulated water.

In order to keep the pitot tube heated, the usual heating coil or element 21 is provided along the interior of the shell 11 and it maintains the temperature of the forward portions of the pitot tube above the freezing point of water so that ice crystals, sleet or other solid forms of water will melt into liquid form and be discharged out through the drain hole 20.

The pitot pressure is transferred from the forward chamber or compartment 12 into pitot tube extensions 23 and 24 that open through bulkhead 15. Small orifice restrictors 25 and 26, respectively, are placed adjacent the open ends of tubes 23 and 24 where the tubes open into the chamber 12. The purpose of these restrictors with the small orifices therein is more fully described and explained in the previously mentioned application Ser. No. 378,368.

The pitot tubes work in conventional manner and the pressure is sensed with suitable instruments (not shown) connected to the extension tubes 23 and 24. The restrictors 25 and 26 are basically for preventing excessive pressure drops in case of a leak in one of the lines so that the proper pitot pressure will be sensed in the other line that does not have a leak.

The static pressure chamber 13 is defined at its forward end by the bulkhead 15 which sealingly engages (either brazed in or cemented in) the housing 11 and is closed by a rear bulkhead 27 that is also sealed to the interior surface of the shell 11. The pitot tubes 23 and 24 pass through the rear bulkhead 27. Also the electrical connections for the heater coils 21 pass through this bulkhead.

A static pressure port 28 opens from the atmosphere into the chamber 13. A pair of remote static pressure lines 31 and 32, respectively, pass through the rear bulkhead 27 and open into chamber 13. These lines, as shown, each have a D-shaped cross section and they are soldered together for rigidity. The lines pass through the bulkhead 27 in a sealing arrangement and extend to suitable instruments located in a pressurized area illustrated schematically at 34. Each of the lines is connected to a separate conventional instrument which is not shown.

While the present example has two static lines, there could be three or more static lines with instruments on each line.

Tubular restrictors 35 and 36, respectively, are placed in the end portions of the static lines 31 and 32 and extend forwardly into the chamber 13. The two restrictors, which are tubes as in the form shown in FIGS. 1, 2 and 3, and form extensions of the remote static lines, are brought together as shown and an ejector or mixing tube 37 is placed around the restrictor tubes 35 and 36. The tubes 35 and 36 open into the ejector tube 37 and the openings of the two tubes are adjacent each other and face generally in the same direction. The mixing tube is shown to be of uniform cylindrical bore however it could be designed to be non-circular or with portions tapered in order to modify the ejector action. The space surrounding the tubes 35 and 36 and the interior of the ejector tube is filled with a suitable material, such as solder or other material so that one end of the ejector is sealed, except for the openings of the restrictor tubes. The other end of the ejector tube is open. The ejector tube 37 extends forwardly in the static chamber 13.

The dimensions of the restrictor tubes and the ejector tube or mixing tube 37 can be varied to fit the particular situation in order to obtain good results. A common relationship is shown in FIG. 3. Assuming that the outer diameter of the restrictor tubes is "D," the restrictor tubes are about 16D long for thin wall tubing, and the distance from the outer terminal ends of the restrictor tubes within the ejector tube, to the outer end of the ejector tube is approximately 12D. The static lines themselves are usually about 2D in diameter, and the ejector tube is also approximately 2D in diameter. The relationship between the diameter of the ejector tube and its length is important. The 6:1 relationship is typical (length from end of restrictor tubes to end of ejector tube is six times the ejector tube diameter) but the relationship may vary from 1:1 to 12:1 for a specific design.

If one of the static lines 31 and 32 should develop a leak in the pressurized cabin 34 (the pressure is maintained near one atmosphere) particularly when the aircraft is flying at high altitude where the external pressure is low, there will be a great pressure differential between the pressure in the static chamber 13 and the cabin. Air would then flow rearwardly or backwards out of the tube 31, and into the static chamber 13. Because the static port 28 is usually relatively small (making it large enough to handle all the leakage flow at a great pressure differential would be impractical) the pressure in the chamber 13 will rise because the leaking fluid will not escape through port 28 rapidly enough. In normal circumstances this would affect the static pressure reading in tube 32 (raise the indicated pressure) and both of the systems would malfunction. However, with the present invention, as shown in FIG. 3, fluid rapidly escaping out through static tube 31 and restrictor tube 35 will flow through the ejector tube at a high velocity. This will cause the pressure in the adjacent restrictor tube 36 and static tube 32 to be less than that in the ejector tube and consequently less than that in the static chamber 13. Because the pressure in static chamber 13 will rise, and in proportion to the rearward air flow reaching the chamber the static pressure indicated at tube 32 will remain substantially the same as the true reading. By proper design of the restrictor tubes and ejector tubes 37, the indicated pressure will not substantially change in tube 32. It can be seen that the greater the flow from tube 31 through the ejector tube 37, the greater the differential in pressure between the chamber 13 and the static tube 32 will be. Likewise, the higher the pressure in chamber 13 will be. This means that the true pressure in tube 32 will tend not to change. If the flow through tube 31 out through ejector tube 37 is low then the pressure in chamber 13 will consequently be closer to the true static pressure and the pressure reduction effect on the restrictor tubes 36 and its static tube 32 will also be less because the flow will be less than tube 31. Automatic compensation is the result.

FIGURES 5 and 6 show substantially the same configuration utilizing the same tubes 31 and 32 except the restrictors are no longer tubular. A bulkhead 40 is placed into sealing engagement with the tubes 31 or 32 and a pair of orifices 41 and 42, respectively, are provided to form restrictors in the ends of the static tubes. Although the orifices are shown to be of uniform bore, they may be of diverging bore to achieve higher ejection action at pressure ratios above critical (critical pressure ratios for air is approximately 1.91). An ejector tube 43 is attached in suitable sealing engagement to the outer end surface of bulkhead 40 so that air flowing through the restrictor orifices 41 or 42 will dump out through the ejector tube 43. This is in the same manner as with the restrictor tubes previously described. The orifices face generally toward the open end of the ejector tube.

Again, the same action would take place in the form of the invention shown in FIGS. 5 and 6 and any leak in the static lines in a pressurized area causes a high velocity flow out through the associated orifice into the ejector tube and this keeps the pressure in the other static tube lower than that in chamber 13. By proper design the pressure in the static tube other than the one that has the leak will remain constant. The ejector tube here has a 6:1 ratio between its diameter and length from bulkhead 40 to the outer end. The orifices are about D in diameter, the ejector tube 4D and the ejector tube length 24D.

The advantage of the form of the invention shown in FIGS. 1–4 is that there is no precision machining of parts necessary as there is in drilling the orifices shown in FIGS. 5 and 6. However, the restrictor orifices will work as well.

The purpose of the restrictors, of course, is to aid in restricting the flow in either direction if leaks occur. The restrictors will serve the same function as those described in the previous application Ser. No. 378,368 mentioned before. This improvement relates to the situation where a leak will develop in a pressurized fuselage compartment. In that instance, the restrictors in order to be effective would either have to be extremely small or else the static opening 28 would have to be quite large to prevent the pressure in the static chamber from rising an inordinant amount and causing error in the second system. The simple usage of a compensation or mixing tube automatically will maintain the pressure in the undamaged tube at a constant level.

The openings of the restrictor tubes 35 and 36 and the orifices 41 and 42 into the mixing or ejector tubes will be termed ports.

We claim:

1. In a pressure indicating system having means defining a static pressure chamber, a first port opening from said chamber and at least a pair of remote fluid conducting lines having line ports open to the static chamber and facing generally in the same direction, said lines extending into a separate location having at times a higher fluid pressure than the static chamber, the improvement comprising a hollow mixing member within the static chamber and surrounding the respective line ports, said hollow member having an opening leading to the static member, whereby a leak in one line in a portion thereof located in said separate location at a time when it has pressure higher than the static chamber causes a fluid flow from the separate location to the static chamber through the hollow member in direction away from the other line port.

2. The combination as specified in claim 1 wherein the ports of the remote lines are adjacent each other.

3. The combination as specified in claim 2 wherein said ports are reduced in cross sectional area from the main portions of said remote lines.

4. The combination as specified in claim 1 wherein said hollow member is tubular and of larger diameter than the remote lines, and the axes of the line ports and the axis of said tubular member are substantially parallel.

5. The combination as specified in claim 3 wherein said remote lines are tubular and extend partially into the hollow member and the axes of the remote lines in the portions of said lines within said hollow member are substantially parallel.

6. The combination as specified in claim 1 wherein said remote lines include restrictor tubes of smaller diameter than the main portion of the remote lines opening into said hollow member.

7. The combination as specified in claim 1 wherein said remote lines are open through small orifices into said hollow member.

8. A static pressure measuring system for an aircraft including an external probe having a static pressure measuring chamber, at least two lines extending from the probe to the interior of said aircraft which is at a higher pressure than the static chamber at times, a first port in the probe external the aircraft and opening into said chamber, means in the probe defining a mixing chamber, said mixing chamber opening into said pressure chamber, said lines opening into said mixing chamber and each having a line port facing generally in the same direction and positioned relative to one another so that flow caused by a break in one line in the region thereof in the interior of said aircraft goes from the interior of the aircraft to the static chamber and exists through the line port for the said one line to cause a reduction of pressure at the other line ports.

9. The system of claim 8 further characterized in that the mixing chamber is a tubular member and of larger diameter than the largest line port and has an axis extending in the same direction as the ports are facing.

10. The combination as specified in claim 9 wherein said remote lines have small restrictor tubes which are reduced in cross sectional area leading into said tubular member.

References Cited

UNITED STATES PATENTS

| | | | |
|---|---|---|---|
| 1,645,449 | 10/1927 | Proebstel | 73—212 |
| 2,404,978 | 7/1946 | Morton | 73—212 |
| 3,276,259 | 10/1966 | Bowles et al. | |
| 3,285,062 | 11/1966 | Flader | 73—212 X |

FOREIGN PATENTS 521,294  5/1940  Great Britain.

RICHARD C. QUEISSER, Primary Examiner.

E. D. GILHOOLY, Assistant Examiner.

UNITED STATES PATENT OFFICE
CERTIFICATE OF CORRECTION

Patent No. 3,415,120                          December 10, 1968

Richard V. De Leo et al.

It is certified that error appears in the above identified patent and that said Letters Patent are hereby corrected as shown below:

Column 2, line 62, after "in" insert -- a --. Column 4, line 8, "be," should read -- be. --; line 16, "than" should read -- from --. Column 5, line 2, "member," should read -- chamber, --. Column 6, line 10, "exists" should read -- exits --.

Signed and sealed this 10th day of March 1970.

(SEAL)
Attest:

Edward M. Fletcher, Jr.

Attesting Officer

WILLIAM E. SCHUYLER, JR.

Commissioner of Patents